(12) United States Patent
Evans et al.

(10) Patent No.: US 7,453,999 B1
(45) Date of Patent: Nov. 18, 2008

(54) PREPAID SERVICES WITH SECURITY PROVISIONS TO PROTECT AGAINST UNAUTHORIZED USE

(76) Inventors: Mark P. Evans, 5 Cambridge Dr., Annandale, NJ (US) 08801; Michael Palumbo, 4 Cherry St., Long Valley, NJ (US) 07962; Robert M. Stanchina, 12 Shippen Ridge, Oxford, NJ (US) 07863

( * ) Notice: Subject to any disclaimer, the term of this patent is extended or adjusted under 35 U.S.C. 154(b) by 868 days.

(21) Appl. No.: 10/899,478

(22) Filed: Jul. 26, 2004

Related U.S. Application Data

(60) Provisional application No. 60/493,290, filed on Aug. 6, 2003, provisional application No. 60/490,734, filed on Jul. 29, 2003.

(51) Int. Cl.
*H04M 15/00* (2006.01)
*H04M 17/00* (2006.01)

(52) U.S. Cl. .............................. 379/114.2; 379/114.14; 379/145

(58) Field of Classification Search ............. 379/111, 379/114.01, 114.05, 114.14, 114.2, 126, 379/127.02, 143, 144.03, 145
See application file for complete search history.

(56) References Cited

U.S. PATENT DOCUMENTS

| | | | |
|---|---|---|---|
| 5,684,291 A | 11/1997 | Taskett | |
| 5,988,509 A | 11/1999 | Taskett | |
| 6,473,500 B1 | 10/2002 | Risafi et al. | |
| 2003/0028471 A1* | 2/2003 | Usui et al. | 705/37 |

* cited by examiner

*Primary Examiner*—Binh K Tieu

(57) ABSTRACT

A method and apparatus for providing a telecommunication service is disclosed wherein a call associated with a first prepaid services account identifier is received from a user. An offer is provided to the user to initiate a replacement service for the first prepaid services account identifier and, upon receiving an indication of an acceptance of the offer from the user, a replacement codeword associated with the first prepaid services account identifier is established. The call associated with the first prepaid services account may be any type of communication, including a telephone call, a message delivered via the internet, or any other voice or data message. Upon receipt of the codeword from the user, a second prepaid services account identifier is established and, in one implementation, the first prepaid services account identifier is deactivated.

25 Claims, 2 Drawing Sheets

| PREPAID SERVICES ACCOUNT ID | REPLACEMENT SERVICE? Y/N | REPLACEMENT SEVICE CODEWORD | USAGE BALANCE | PIN | ...... |
|---|---|---|---|---|---|
| 123-456-7890 | Y | A8CF9RE | $40 | 1234 | ...... |

| PREPAID SERVICES ACCOUNT ID | REPLACEMENT SERVICE? Y/N | REPLACEMENT SEVICE CODEWORD | USAGE BALANCE | PIN | ...... |
|---|---|---|---|---|---|
| 098-765-4321 | Y | A8CF9RE | $40 | 1234 | ...... |

PREPAID SERVICES WITH SECURITY PROVISIONS TO PROTECT AGAINST UNAUTHORIZED USE

This application claims the benefit of U.S. Provisional Application No. 60/493,290, filed Aug. 6, 2003 and U.S. Provisional Application No. 60/490,734, filed Jul. 29, 2003, both of which are hereby incorporated herein by reference.

BACKGROUND OF THE INVENTION

The provisioning of various services using prepaid accounts has proliferated over the past decade in applications such as, for example, prepaid telephone services using prepaid cards. Such prepaid cards are usually sold through retail outlets and typically have imprinted information on the cards including an access telephone number and a prepaid services account identification number.

In accordance with one prior implementation of these services, the customer dials the access telephone number imprinted on the card and is then prompted to input the prepaid services account identification number as well as the telephone number the customer desires to call. In this implementation, the service platform determines if there is an available balance associated with the customer account, and if so, the customer is connected to the called number. The cost for the call is then typically decremented from the account balance.

A significant problem associated with the retail sale of prepaid telephone cards is related to the cash-like nature of such cards. Specifically, anyone who gains access to the prepaid services account identification number and the access telephone number can use the prepaid balance. Therefore, in order to prevent the unauthorized use of such prepaid cards, various security measures have been devised. For example, a high level of security is required to prevent the theft of account identification numbers and access telephone numbers by those involved in the manufacturing process of prepaid cards. Additionally, the sale of such cards at retail outlets initially required that checkout personnel hold the cards until they were sold in order to prevent customers from obtaining the critical numbers from cards that are openly displayed. This was disadvantageous in that securely maintaining the cards with checkout personnel, rather than offering them on an open display, very significantly limited sales and was therefore a significant marketing concern.

Therefore, various security-related processes have been implemented in order to permit open display of prepaid telephone cards while maintaining the security of critical information, such as the prepaid services account identification number. For example, such critical information can be covered with scratch-off material to prevent others from copying the information from openly displayed cards. However, this does not prevent the theft of cards from an open display and the subsequent use of such stolen cards by the thieves. Therefore, in order to address the concern of the theft of openly displayed cards, cards are frequently not activated until they are actually purchased. In one such activation technique, typically performed at the point-of-sale of prepaid cards, the card is attached to a hang-tag for display purposes, but has a bar code imprinted on it. When a customer desires to buy a card, that customer removes the card from the display and delivers it to the personnel at the checkout counter. Upon receipt of payment, the checkout person scans the bar code and the information is transmitted, usually in real-time, to a service platform. The card is then activated by the service platform. Thereafter, the customer removes the scratch off material to obtain the critical information (once again, for example, the account identification number) and uses the prepaid telephone service as described above. Thus, since the card is openly displayed it is accessible to retail customers while, at the same time, if the card is stolen from the display it can not by used because it has not been activated However, a significant security problem remains in that, if the card is purchased by a customer and is subsequently lost, anyone who finds the card will have access to the critical information and may then be able to use the balance remaining in the account. This lost card problem is recognized by those in the industry as a significant hindrance to the sale of prepaid cards. Thus, various methods of solving the lost card problem have been devised. Specifically, in one prior attempt, a prepaid card was provided with an identification code and a replacement identification code with the replacement identification code illustratively printed on a separate document from the prepaid card. Thus, if the card was lost, the consumer provided the replacement code to the card issuer and the card issuer issued a new card to the consumer. However, this attempt was still subject to the problem of potential theft or fraud by employees of the issuer of the phone cards. Therefore, in another prior attempt, the card was issued a security code only at time of activation—the prepaid cards were not shipped with a security code. However, this was still problematic in that the cards were not replaceable. Thus, if the card was lost, there was no provision for recovering the lost balance remaining on the card. Additionally, even if some form of replacement service were provided (as described in the attempt above), the consumer was still encumbered with an absolute requirement of choosing a security code.

SUMMARY OF THE INVENTION

The aforementioned problems associated with prepaid services cards, such as prepaid telephone services cards, have been essentially solved by the present invention. Specifically, the present inventors have invented a method and apparatus for use with a prepaid services card issued to a user. As discussed above, such cards have, for example, a prepaid services account identifier and a telephone access number to access a services platform. In accordance with one embodiment of the principles of the present invention, the user may elect (e.g., during activation of the prepaid services card) to initiate a replacement service that will replace the initial prepaid services account identifier with a separate identifier upon request by the user. A replacement service provider may, for example, charge a fee for this replacement service. Therefore, if a user does not wish to pay this fee, the user may elect not to initiate the replacement service and, accordingly, may use the card without an option to replace the account identifier in the event the card is lost or stolen. In another embodiment, a user calls a replacement service provider when that user desires to replace the initial prepaid services account identifier (e.g., if the card is lost). This call may illustratively be any type of communication, including a telephone call, a message delivered via the internet, or any other voice or data message. Upon receiving a codeword from the user, the replacement service provider establishes a second prepaid services account identifier and provides it to the user. In another embodiment, the first prepaid services account identifier is deactivated after the second prepaid services account identifier. Finally, in yet another embodiment, the prepaid services account identifier may be activated for utilizing prepaid services even if the offer for replacement service is declined by the user.

Finally, in yet a further embodiment, a call associated with a first prepaid services account identifier is received from a user; an offer is provided to the user to initiate a replacement service for the first prepaid services account identifier; and, upon receiving an indication of an acceptance of the offer from the user, a replacement codeword associated with the first prepaid services account identifier is established. The call associated with the first prepaid services account may illustratively be any type of communication, including a telephone call, a message delivered via the internet, or any other voice or data message.

DETAILED DESCRIPTION OF THE INVENTION

Figure 1:
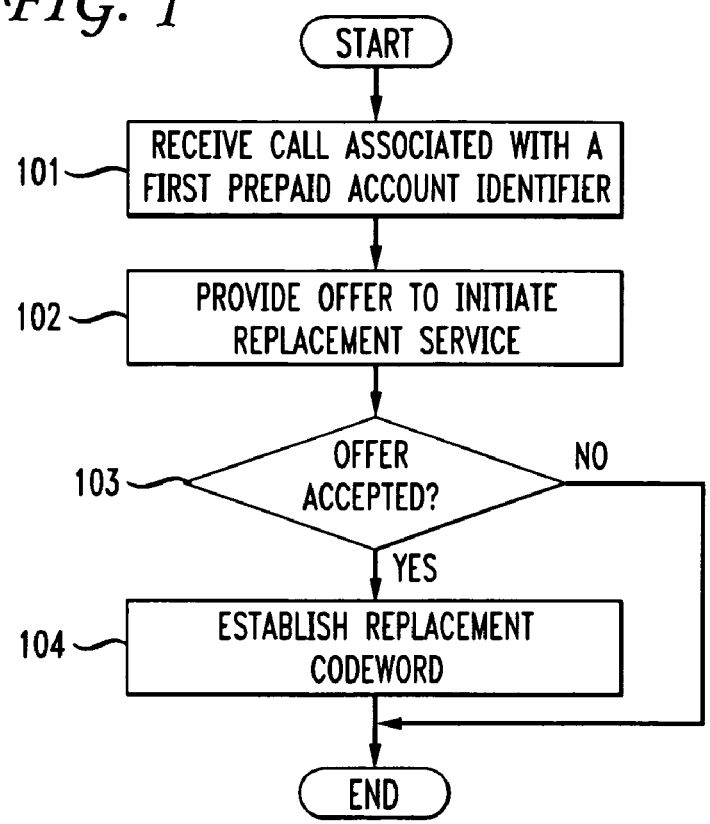
FIG. 1 is a flowchart showing the steps of an illustrative method to offer a prepaid card replacement service in accordance with the principles of the present invention.

FIG. 1 is a flowchart showing one embodiment in accordance with the principles of the present invention wherein a user of a prepaid service may optionally establish a replacement codeword that allows that user to request a replacement of the card and/or the prepaid services account identifier or number associated with the card. Referring to FIG. 1, at step 101, a replacement service provider receives a call from the user who has purchased (or otherwise obtained) a first prepaid account identifier, illustratively an account number on a prepaid telephone services card. In response to receiving this call, at step 102, the replacement service provider provides an offer to initiate a replacement service for the prepaid services account identifier associated with the prepaid service purchased by the user. Next, at step 103, a determination is made whether or not the user accepts the offer of step 103. If the user does not accept the offer, no replacement service is initiated. If, however, the user does accept the offer of step 103, the replacement service provider establishes at step 104 a replacement codeword. As used herein, the term codeword is intended to encompass any series of characters or symbols, such as any series of numbers and/or letters, whether represented in alphanumeric format or a machine-readable (e.g., barcode) format. The codeword is, illustratively, associated with the original prepaid services account identifier. As such, the codeword may be cryptographically related to the original account identifier or, alternatively, may be associated in a database record with the original account identifier.

One skilled in the art will recognize that different methods can be used to initiate the replacement service with a replacement service provider. For example, the user who purchased a prepaid services card may be required to call to activate the card, at which time the user will be given the option to initiate, the replacement service. Alternatively, the card may be activated at the POS and instructions for initiating the replacement service can be provided either separately or printed on the prepaid services card. Any offer to initiate a replacement service concurrently or subsequent to the purchase services associated with a prepaid services account identifier is intended to be encompassed by the embodiments disclosed herein. One skilled in the art will also recognize that the call used to initiate the replacement service does not need to be a telephone call but may be, for example, an electronic communication transmitted over the internet. Finally, one skilled in the art will also recognize that the replacement service provider may also be a telecommunications service provide or may be a third party vendor offering replacement services for a telecommunications vendor or prepaid services account vendor.

Figure 2:
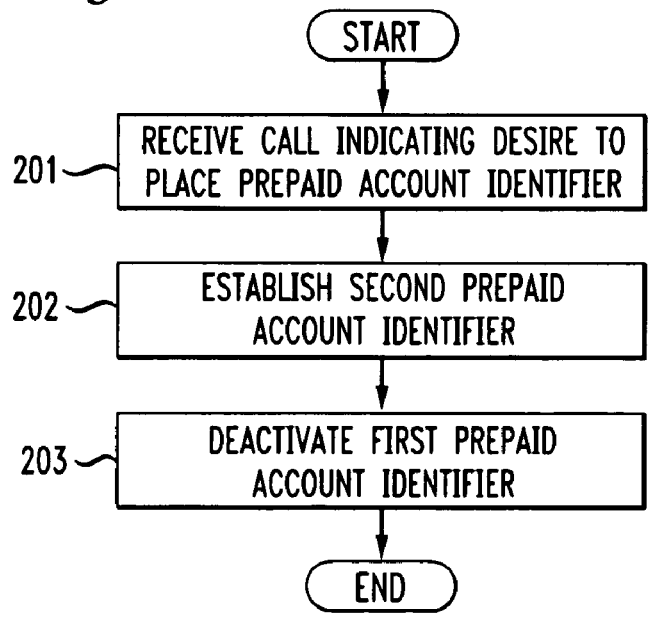
FIG. 2 is a flowchart showing the steps of an illustrative method to utilize a prepaid card replacement service in accordance with the principles of the present invention.

In this way, referring to FIG. 2, subsequent to the initiation of the replacement service and the issuance of the replacement codeword, if the replacement service provider receives an indication at step 201 that the user wishes to utilize the replacement service (e.g., if a prepaid services card having the original prepaid services account identifier is lost), at step 202 the replacement service provider establishes a second prepaid account identifier and, illustratively, at step 203 deactivates the first prepaid account identifier. The user then uses the second prepaid account identifier to obtain future prepaid services. Therefore, if, for example, a prepaid services card is lost or stolen, the purchaser of that card can continue to use the prepaid service without interruption until the purchased amount of prepaid services (e.g., a specific dollar amount of such services) is depleted.

Figures 3, 4, 5:
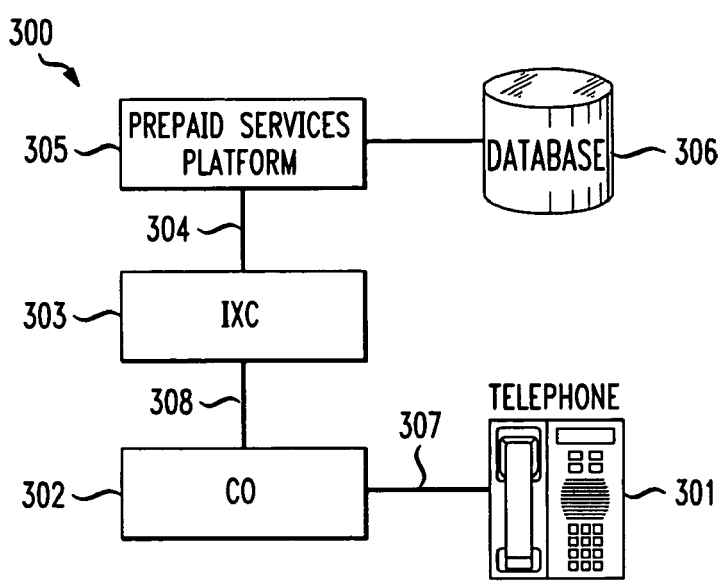
FIG. 3 shows a schematic of an illustrative prepaid card services system in which a replacement service in accordance with the principles of the present invention may be implemented.
FIG. 4 shows an illustrative record of a database associated with a prepaid card replacement system in accordance with the principles of the present invention.
FIG. 5 shows the database record of FIG. 4 wherein the prepaid services account ID has been replaced by a replacement prepaid services account ID.

FIG. 3 shows a communication network 300 within which the present invention, as illustratively embodied in FIGS. 1 and 2 and the associated discussion, may be implemented. Network 300 illustratively comprises telephone 301 connected to a central office switch (CO) 302 via communications link 307 (e.g., a copper pair). CO 302, in turn, is connected to interexchange carrier switch (IXC) 303 via communication link 308. IXC 303 is connected to service platform 305 which is, illustratively, a service platform associated with a prepaid telephone service. Service platform 305 may be, for example, a programmable computer containing appropriate hardware and software in order to perform the functions described herein. Such platforms, also sometimes referred to as adjuncts, are well known in the art of telecommunications. It is also noted here that the functions described herein may be performed directly by the IXC 303 (which may also include appropriate hardware and software for performing the functions described herein) rather than by the service platform 305. One skilled in the art would recognize that there are various possible configurations that would be equally useful in accordance with the principles of the present invention. Many of the functions described herein may be performed by hardware, software, or a combination of hardware and software.

Referring once again to FIG. 3, service platform 305 is, for example, further connected to a database (DB) 308 which contains records, such as records associated with individual subscribers, used in the operation of service platform 305. As is well known, communication networks, such as network 300, generally contain a plurality of central office switches, each of which is typically connected to a plurality of telephones. The architecture of a communication network, such as network 100, is well known in the art and will not be described in further detail herein.

As discussed above, a user may be presented with an offer to initiate a replacement service. Illustratively, this offer is presented when the platform receives a call from the user (e.g., the first time the user contacts the service platform 305).

In this case, referring once again to FIG. 3, a user places a call from illustrative telephone 301 and is connected to the prepaid services platform 305 via CO 302 and IXC 303. The prepaid services platform 305, in turn, presents the offer to initiate a replacement service to telephone 301 via IXC 303 and CO 302. Upon receiving either an acceptance of the offer or a declination of the offer, prepaid services platform 305 updates a record associated with the prepaid services account identifier of the user and stores the updated record in database 306.

FIG. 4 shows an illustrative record of database 306 in accordance with the principles of the present invention. In that figure, field 401 stores the prepaid services account ID that is, for example, a unique account number, here 123-456-7890, that is issued for a prepaid services card. Field 402 is an illustrative replacement service field that indicates whether or not a user has accepted an offer to initiate a replacement service. Here, illustratively, the Y in field 402 indicates that the user has accepted such an offer. Field 403 is a field that is illustratively populated only if field 402 indicates that a replacement service has been initiated. In this illustrative example, codeword A8CF9RE has been assigned to the user. This assignment may be made automatically upon the user accepting an offer to initiate the replacement service or, alternatively, the user may be prompted to manually enter a codeword (illustratively, for example, using a keypad on a telephone). Other fields are illustratively present in record 400. For example, field 404 indicates the remaining usage balance (here $40) associated with the prepaid services account identifier. Additionally, illustrative field 405 may contain a PIN for use in initiating a prepaid service session (e.g., placing a prepaid telephone call). One skilled in the art will recognize that record 400 is merely illustrative in nature and that additional fields may also be used in area 406 of record 400.

FIG. 5 shows the database record of FIG. 4 wherein the user has requested replacement of the original prepaid services account identifier. Specifically, when the user wishes to utilize the replacement service described above (such as when the user has lost a prepaid services card) that user will illustratively contact the prepaid services platform 305 of FIG. 3. When the user inputs the codeword, it is verified with the codeword stored in field 403 of record 400 in FIG. 4. One skilled in the art will recognize that, as previously discussed, the codeword may be cryptographically related to the prepaid services account identifier and, accordingly, field 403 of record 400 in FIG. 4 would not be required. Instead, the prepaid services platform could decrypt the codeword when it is received in order to extract the prepaid account services identifier of field 401 of FIG. 4. In an alternative embodiment, the codeword could be the same as the prepaid account services identifier. Referring again to FIG. 5, regardless the verification method used, when the codeword entered by the user is verified, the replacement service provider then issues a new prepaid service account identifier and, illustratively, stores this replacement identifier, here 098-765-4321, in record 500, for example in field 501. One skilled in the art will recognize that there are many possible implementations of storing this new prepaid service account identifier. For example, instead of storing the new account identifier directly in field 501 and, thus, replacing the original prepaid service account identifier, it may be desired to store both the original and new identifiers. Accordingly, separate fields in record 500 may be assigned for both the original and new identifiers.

One skilled in the art will also recognize that various other implementations are possible in conjunction with the replacement service described herein above. For example, as discussed previously, the replacement service provider may charge a fee for initiating the replacement service plan. In such an implementation, such a fee can be paid as part of the card purchase or, illustratively, can be paid as an additional, insurance-type service upon payment of an incremental fee. In such circumstances, the incremental fee may be paid by decrementing part of the cash balance associated with the account or, alternatively, may be paid, for example, as a higher transaction fee for utilizing the prepaid services (e.g., as a higher per-minute charge for telephone calls).

Other arrangements will also be obvious to those skilled in the art. For example, while the principles of the present invention are discussed herein in association with the purchase of a prepaid services card, such a card need not be purchased. For example, the prepaid services account number and any other information (such as replacement codeword and/or PIN) may be provided via other means. Specifically, in one such implementation, the information may be provided on another instrument, such as media adapted to store digital data. Such media include, without limitation, a storage card, smart card, or magnetic media storage disc. Alternatively, the account may not have any associated instrument. In such embodiments the purchaser could be given the account identifier and any other information such as an access number or internet address by other means, such as for example over the Internet. Finally, it will be obvious to one skilled in the art that any method of communication, including wireless communications may be used in conjunction with principles of the present invention.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for providing a telecommunication service comprising the steps of:
   receiving a call associated with a first prepaid services account identifier;
   providing an offer to initiate a replacement service for said first prepaid services account identifier; and
   establishing a replacement codeword upon receiving an indication of acceptance of said offer, said replacement codeword associated with said first prepaid services account identifier.

2. The method of claim 1 further comprising:
   establishing a second prepaid services account identifier upon receiving at least a first indication of a desire to utilize said replacement service.

3. The method of claim 2 further comprising deactivating said first prepaid services account identifier.

4. The method of claim 2 wherein said at least a first indication comprises said codeword.

5. The method of claim 2 wherein the codeword is said second prepaid services account identifier.

6. The method of claim 2 wherein a fee is charged to obtain said second prepaid services account identifier.

7. The method of claim 1 further comprising:
   activating said first prepaid services account identifier upon receiving an indication of rejection of said offer.

8. The method of claim 1 wherein said call is a telephone call.

9. The method of claim 1 wherein said call is a communication received via a data network.

10. The method of claim 1 wherein a fee is charged to initiate said replacement service.

11. The method of claim 10 wherein said fee is deducted from an account balance associated with said first prepaid services account identifier.

12. The method of claim 10 wherein said fee is collected by increasing at least a first cost associated with said first prepaid services account identifier.

13. Apparatus comprising:
   means for receiving a call associated with a first prepaid services account identifier;
   means for providing an offer to initiate a replacement service for said first prepaid services account identifier; and
   means for establishing a replacement codeword upon receiving an indication of acceptance of said offer, said replacement codeword associated with said first prepaid services account identifier.

14. The apparatus of claim 13 further comprising:
   means for establishing a second prepaid services account identifier upon receiving at least a first indication of a desire to utilize said replacement service.

15. The apparatus of claim 14 further comprising means for deactivating said first prepaid services account identifier.

16. The apparatus of claim 14 wherein said at least a first indication comprises said codeword.

17. The apparatus of claim 13 further comprising:
   means for activating said first prepaid services account identifier upon receiving an indication of rejection of said offer.

18. The apparatus of claim 13 wherein said call is a telephone call.

19. The apparatus of claim 13 wherein said call is a communication received via a data network.

20. The apparatus of claim 13 wherein the codeword is said second prepaid services account identifier.

21. The apparatus of claim 13 further comprising means for charging a fee to initiate said replacement service.

22. The apparatus of claim 21 wherein said means for charging a fee comprises means for deducting a fee from an account balance associated with said first prepaid services account identifier.

23. The method of claim 21 wherein said means for charging a fee comprises means for collecting said fee by increasing at least a first cost associated with said first prepaid services account identifier.

24. A computer readable medium storing a database, said database comprising a plurality of records, each of said records comprising:
   a first prepaid services account identifier field for storing a first prepaid services account identifier, said field for identifying a record associated with a subscriber; and
   at least one replacement service criteria field for storing a value indicative of whether said subscriber has accepted an offer to initiate a replacement service for said first prepaid services account identifier.

25. The computer readable medium of claim 24 further comprising a second prepaid service account identifier field for storing a second prepaid service account identifier, wherein said second prepaid service account identifier is different from said first prepaid services account identifier.

* * * * *